United States Patent [19]

D'Altilia et al.

[11] Patent Number: 4,477,277
[45] Date of Patent: Oct. 16, 1984

[54] PROCESS FOR PRODUCING HIGH-PURITY METALS

[75] Inventors: Gianluigi D'Altilia, Rome; Francesco Rinaldi, Florence, both of Italy

[73] Assignee: Samim Societa Azionaria Minero-Metallurgica SpA, Rome, Italy

[21] Appl. No.: 506,492

[22] Filed: Jun. 21, 1983

[30] Foreign Application Priority Data

Jun. 22, 1982 [IT] Italy .................. 21977 A/82

[51] Int. Cl.$^3$ .............................. B22F 9/00
[52] U.S. Cl. .................. 75/0.5 B; 75/0.5 BA; 75/0.5 BB; 75/82; 75/84.4; 75/84.5; 423/350
[58] Field of Search ........... 75/0.5 B, 0.5 BA, 0.5 BB, 75/84.4, 84.5, 82; 423/350

[56] References Cited

U.S. PATENT DOCUMENTS

| | | | |
|---|---|---|---|
| 2,883,269 | 4/1959 | Krchma et al. | 423/350 |
| 2,909,411 | 10/1959 | Krchma | 423/350 |
| 3,041,145 | 6/1962 | Aries | 423/350 |
| 4,139,438 | 2/1979 | Fey et al. | 423/350 |

Primary Examiner—W. Stallard
Attorney, Agent, or Firm—Hedman, Gibson, Costigan & Hoare

[57] ABSTRACT

High-purity metals are obtained by reducing the respective halides with reducing metals in the vapor phase in two or three stages, said reducing metals having greater halogen affinity than that of the metals to be reduced.

4 Claims, 1 Drawing Figure

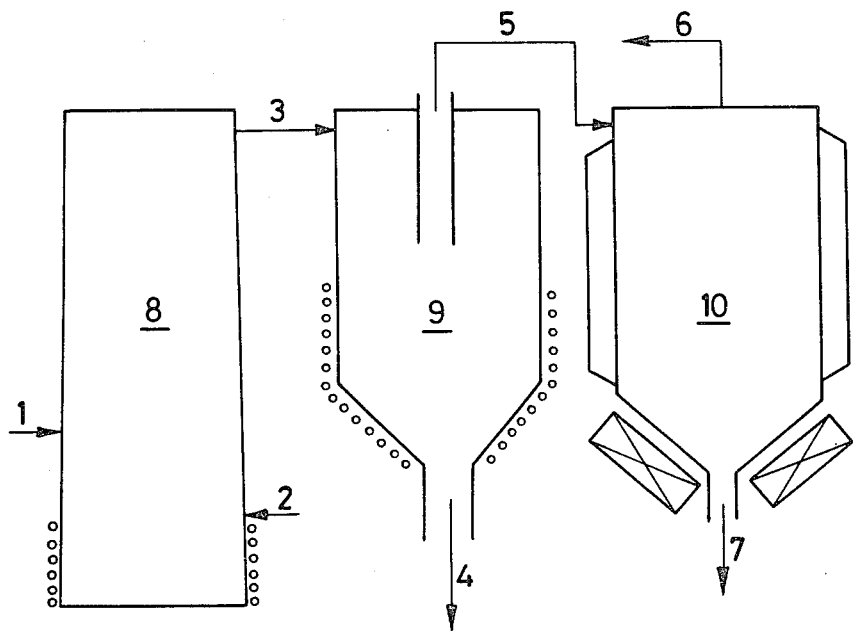

PROCESS FOR PRODUCING HIGH-PURITY METALS

This invention relates to a process for producing high-purity metals.

More particularly, the present invention relates to a process for producing elemental silicon.

Reference will be made hereinafter essentially only to the case of silicon, although the process can be extended to a very large number of metals.

The known art can be considered as that reported in U.S. Pat. Nos. 2,909,411 and 3,012,862.

In the first of these, elemental silicon is formed by reacting a silicon halide with a reducing agent chosen from zinc and cadmium, in the vapour phase. The silicon produced is only partly recovered, and this latter is deposited on the reactor walls, from which it has to be subsequently scraped away.

In the second of the two cited USA patents, the silicon halides are reduced with a reducing agent in the vapour phase in the presence of elemental silicon particles which constitute the condensation nuclei for the elemental silicon to be produced.

As stated, the process described in U.S. Pat. No. 2,909,411 does not allow complete conversion of the fed silicon halide to elemental silicon, because a part of the silicon produced becomes mixed with the molten reducing metal, and this means that there is also a contamination of the reducing metal by the silicon.

Furthermore, the fact that the elemental silicon becomes deposited on the reactor walls involves on the one hand the expense of scraping said silicon deposit away, and on the other hand a certain contamination of the silicon due to the mechanical means used for its removal.

The process described in U.S. Pat. No. 3,012,862 suffers on the other hand from the drawback of having to use silicon particles acting as nucleation centres in order to accomplish the reaction, and this involves the disadvantage of having to choose the nucleation particles within a very narrow size range in order to attain correct and uniform fluidisation of the particles in the bed, and of having to procure a pure source of silicon particles.

It has been surprisingly found that the drawbacks of the known art can be obviated by using a reaction in which silicon halides are reduced by reducing metals in the vapour phase in two or three stages. The process according to the present invention comprises the following stages:

(1) mixing the reducing metal vapour with one or more silicon halides (gas) either outside or within a primary reaction zone, with possible partial reaction (2) reacting the reducing metal with the silicon halides in a primary reaction zone at a temperature exceeding the dew point of the reducing metal used, preferably greater than 500° C., but less than the silicon solidification temperature, at atmospheric pressure or higher (3) completing the reaction of point (2) in a cyclone-shaped reaction zone under the same temperature and pressure conditions as the primary reaction zone (4) separating the elemental silicon in the form of powder from the bottom of the cyclone-shaped reaction zone (5) recovering the reducing metal halide or halides and the unreacted reducing metal in a cold trap, which operates at a temperature exceeding the dew point of the silicon halide or halides, which emerge without condensing and are fed to recovery.

According to a modification of the present invention, powdered silicon can be used in order to accelerate the reaction, said powdered silicon being introduced either into the primary reaction zone or into the cyclone-shaped reaction zone, or into both. The fluidodynamic conditions in the mixing zone and primary reaction zone are such as to prevent silicon deposits both on the base and walls of these zones.

The apparatus in which the process is carried out are preferably of quartz. It should be noted that although operating at a pressure exceeding atmospheric leads to drawbacks in terms of dimensioning, it is in fact advantageous thermodynamically in that more elemental silicon is formed, and thus the process yield increases.

The process according to the present invention is applicable not only to the production of silicon from silicon halides but also to the production of metals such as Zr, Ni, Ti, W, Nb, Ta, Co and No from their halides.

The reducing metal used can be any metal which is in the vapour state when at a temperature at least 50° C. lower than the solidification temperature of the metal to be produced, and which has a greater halogen affinity.

It is preferably Zn or Cd.

The invention is described hereinafter with reference to the process diagram of the accompanying FIGURE, which illustrates a non-limiting embodiment thereof.

The reactor 8, internally lined with quartz, is fed either continuously or batchwise with liquid zinc 2 and silicon tetrachloride 1.

The zinc vaporises by electric heating, preferably induction heating, and mixes with the silicon tetrachloride in the bottom zone of the reactor 8.

The primary reaction zone is represented by the middle-top zone of the reactor 8, and within it most of the silicon tetrachloride is reduced to elemental silicon by the zinc at a temperature of 900°–1000° C.

The reaction products leave the reactor 8, and pass through the pipe 3 to enter the cyclone-shaped reaction zone 9 where the reaction is completed and the elemental silicon is separated in the form of powder from the bottom (4). The zinc chloride formed in the reaction, and the unreacted silicon tetrachloride and zinc metal leave from 9 and pass through the pipe 5 to the condenser 10 (cold trap) which is at a temperature of 200°–300° C.

Condensed zinc chloride and zinc 7 leave from the bottom of the condenser 10, and the silicon tetrachloride 6 is withdrawn from the top in the gaseous state and fed to recovery.

20–30% of the total silicon halides are converted in the cyclone-shaped reactor.

A non-limiting practical embodiment is described by way of example hereinafter with reference to the flow diagram of the accompanying FIGURE.

EXAMPLE

The material balance relates to the production of 1 kg of silicon. The reactor 8 is fed with 4.7 kg of Zn, which are heated to 950° C. with an electricity consumption for heating purposes of 3 kWh, and 6.1 kg of silicon tetrachloride.

9.7 kg of $ZnCl_2$ are extracted from the reactor 8. The electricity consumption in the cyclone 9 is 0.6 kWh and in the condenser 10 is 0.6 kWh. The condenser operates at a temperature of 250° C. The pressure is atmospheric in 8 and 9, and is negative in the condenser 10.

The silicon obtained is of high purity.

I claim:

1. A process for producing high-purity metals from their halides by reducing them with metals in the vapor phase, comprising:
   (a) mixing the reducing metal vapour with one or more halides of the required metal either outside or within a primary reaction zone, with possible partial reaction
   (b) reacting the reducing metal with the halides of the required metal in a primary reaction zone at a temperature exceeding the dew point of the reducing metal used, preferably greater than 500° C., but less than the solidification temperature of the required metal, and at atmospheric pressure or higher
   (c) completing the reaction of point (b) in a cyclone-shaped reaction zone under the same temperature and pressure conditions as the primary reaction zone
   (d) separating the required metal in the form of powder from the bottom of the cyclone-shaped reaction zone
   (e) recovering the reducing metal halide or halides in a cold trap which operates at a temperature exceeding the dew point of the halide or halides of the required metal, which leave without condensing and are fed to recovery.

2. A process as claimed in claim 1, wherein the high-purity metal produced from its halide is Si, Zr, Ni, Ti, W, Nb, Ta, Co or Mo.

3. A process as claimed in claim 2, wherein the reducing metal is Zn or Cd.

4. A process as claimed in claim 3, wherein powdered silicon is fed into the primary reaction or into the cyclone-shaped zone or into both.

* * * * *